April 14, 1942.  D. HAGE  2,279,513
VALVE
Filed Oct. 24, 1939
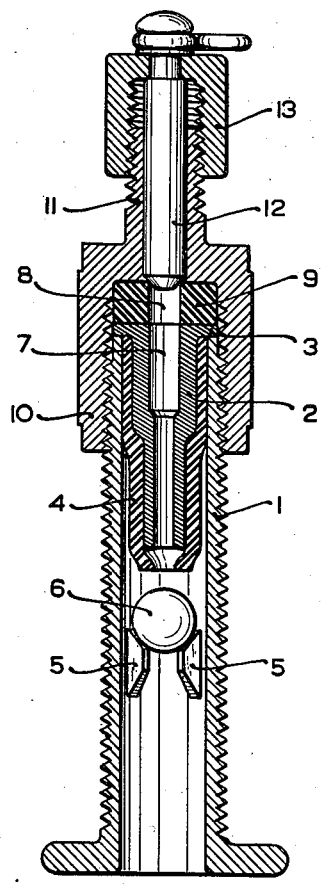
Inventor:
D. Hage
By E. F. Wenderoth
Atty Patented Apr. 14, 1942

2,279,513

UNITED STATES PATENT OFFICE 2,279,513

VALVE

David Hage, Hoorn, Netherlands

Application October 24, 1939, Serial No. 301,034
In the Netherlands December 10, 1938

1 Claim. (Cl. 251—121)

This invention relates to valves, particularly but not exclusively for use in connection with inflatable tires, of the type comprising, in combination, a casing, a check valve structure within said casing, a packing body within said casing seated at its inner end against a part of said check valve structure, said packing body having a duct for flow of fluid therethrough to said check valve structure, a gland member engaging the outer end of said packing body, means for moving said gland member inwardly to force said packing body into fluid tight engagement with said part of the check valve structure, said gland member having a duct communicating with the duct in said packing body, a manually operable valve extending through the duct in said gland member and adapted for sealing cooperation with said packing body, and means adjustably and removably mounting said manually operable valve on said gland member. A valve of this type has been disclosed in my prior Patent No. 2,088,788.

It is the object of this invention to simplify valves of this type, and particularly to facilitate the removal of certain parts thereof for the purpose of inspection, renewal or repair. With this object in view, my invention consists in that the said part of the check valve structure is provided with a shoulder or flange engaging the outer end face of the casing, and is jacketed by an elastic, for instance rubber, tube clamped in between the same and the inner wall of the casing.

Since the flange or shoulder of said part of the check valve structure projects from the casing so as to be freely accessible after removal of the packing body, it can readily be withdrawn from the casing.

Furthermore, the gland member of my novel valve may be of very simple construction and consists, for example, of a cap nut provided with a reduced, externally screw-threaded tubular extension adapted to receive the ordinary pump nipple and to guide the manually operable valve, since the elements that are to be forced into sealing cooperation, viz., the said flange or shoulder and the packing body, are mounted outside the casing, instead of inside as in known constructions. Consequently, the valve is cheaper to manufacture.

In my novel valve, it is not necessary to provide for a fluid tight engagement of the packing body and the inner wall of the casing. All that is required is a fluid tight engagement of the flange or shoulder and said packing body, so that the latter may be made of comparatively hard rubber or similar material. Moreover, the outer diameter of the packing body may be substantially equal to that of the casing, so that the contact surfaces between said body and the flange or shoulder on the one side, the gland member on the other side, may be large enough to prevent damage to the packing body if the gland member is arranged to rotate relative to said body when the latter is forced into sealing engagement with the flange or shoulder. Finally, the comparatively hard packing body provides a reliable seat for the manually operable valve, which, consequently, is adapted to bring about a fluid tight seal of the duct in said body.

In order that my invention may be well understood, I shall now proceed to describe the same with reference to the annexed drawing, which illustrates, by way of example only, a longitudinal sectional elevation of a valve constructed in accordance with my novel principles.

In the drawing, 1 is the tubular, externally threaded casing of the valve. A sleeve 2, provided at its top or outer end with a flange or shoulder 3, is housed in said casing in such a manner that the bottom face of flange 3 engages the top or outer end face of the casing 1. Sleeve 2 is jacketed by a rubber tube 4, the lower or inner end of the latter projecting beyond the lower or inner end of the sleeve. A small distance below the lower end of tube 4 is a ball 6 supported by projections 5 on the inner wall of casing 1. As will be understood, the ball 6 and the lower end of sleeve 2 together form a check valve structure.

Sleeve 2 is provided with a duct 7 in register with a duct 8 in an annular packing body 9 of relatively hard rubber or other suitable material. Said body 9, which may be composed of two or more superposed rings, is supported by flange 3 and fits within a cap nut 10 screwed on the top end of casing 1. Obviously, rotation of cap nut 10 in the proper direction will force the packing body 9 into sealing engagement with the top face of flange 3, when the rubber tube 4 will be clamped in, through a substantial part of its length, between sleeve 2 and the inner wall of casing 1 to bring about a fluid tight seal.

The cap nut 10 is provided with a reduced, tubular stem 11, and passed through the latter is a needle valve 12 secured to a cap nut 13, which is screwed on said stem. Downward screwing movement of nut 13 will force the lower end of the needle valve 12 into fluid tight sealing engagement with the top edge of the duct in body 9 which thus provides the requisite valve seat.

After removal of the cap nut 13 with the needle valve 12 secured thereto, the ordinary inflating pump nipple can be screwed on stem 11.

If the cap nut 10, 11, which actually forms the gland member, has been screwed off the casing 1, the sleeve 2 together with the rubber tube 4 can simply be withdrawn from the casing, when it is desired for this tube to be inspected, repaired or renewed.

What I claim is:

A valve device comprising a casing, a check valve structure housed within said casing and comprising a part which partially projects into the casing and is provided with a duct and a shoulder engaging the outer end face of the casing, an elastic tube clamped between said part and the inner wall of the casing for jacketing said part and projecting beyond said part to form a valve seat, a check valve within said casing cooperating with said seat, a seating member of relatively hard rubber or like material arranged with its inner end face against the outer end face of said part and provided with a duct communicating with the duct of said part, and a gland member in threaded engagement with the casing and adapted to press the seating member against the outer end face of said part.

DAVID HAGE.